United States Patent
Blum et al.

(10) Patent No.: US 10,399,217 B2
(45) Date of Patent: Sep. 3, 2019

(54) HANDHELD MACHINE TOOL HAVING A SPINDLE-LOCKING DEVICE

(71) Applicant: Robert Bosch GmbH, Stuttgart (DE)

(72) Inventors: Jens Blum, Filderstadt (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 14/313,545

(22) Filed: Jun. 24, 2014

(65) Prior Publication Data

US 2015/0000950 A1 Jan. 1, 2015

(30) Foreign Application Priority Data

Jun. 26, 2013 (DE) .................. 10 2013 212 193

(51) Int. Cl.
  *B25F 5/00* (2006.01)
  *B23B 45/00* (2006.01)
  *B23B 45/02* (2006.01)

(52) U.S. Cl.
  CPC ............ *B25F 5/001* (2013.01); *B23B 45/008* (2013.01); *B23B 45/02* (2013.01); *B23B 2270/60* (2013.01)

(58) Field of Classification Search
  CPC ...... B25F 1/00; B25F 1/04; B25F 5/00; B25F 5/001; B23B 45/008; B23B 45/02; B23B 2270/00; B23B 2270/60
  USPC .................................. 173/164, 213; 279/62
  See application file for complete search history.

(56) References Cited

U.S. PATENT DOCUMENTS

| | | | |
|---|---|---|---|
| 5,947,254 A * | 9/1999 | Jones | B25F 5/001 192/223.2 |
| 6,279,714 B1 | 8/2001 | Hsu | |
| 6,311,787 B1 * | 11/2001 | Berry | B25F 5/001 173/176 |
| 6,702,090 B2 * | 3/2004 | Nakamura | B25B 21/00 173/217 |
| 7,063,201 B2 * | 6/2006 | Nakamura | B25F 5/001 173/217 |
| 8,011,444 B2 * | 9/2011 | Pyles | B23Q 5/20 173/164 |
| 8,047,242 B2 * | 11/2011 | Wall | B24B 23/022 144/136.95 |

(Continued)

FOREIGN PATENT DOCUMENTS

| CN | 201143667 Y | 11/2008 |
|---|---|---|
| CN | 101730612 A | 6/2010 |
| CN | 103153549 A | 6/2013 |

*Primary Examiner* — Gloria R Weeks
(74) *Attorney, Agent, or Firm* — Norton Rose Fulbright US LLP; Gerard Messina

(57) ABSTRACT

In a handheld machine tool having a tool housing, in which a drive motor is situated for driving a drive element equipped with at least one clamping surface, to which a spindle-locking device equipped with a blocking element and at least one spindle cylinder is assigned, the at least one spindle cylinder being able to be clamped in a spindle-lock operation of the spindle-locking device between the at least one clamping surface and the blocking element in order to prevent the drive element from rotating relative to the tool housing, the spindle-locking device has an impingement element, which is developed to impinge on the at least one spindle cylinder with a specified force in the direction of the at least one clamping surface.

9 Claims, 6 Drawing Sheets

(56) References Cited

U.S. PATENT DOCUMENTS

| | | | | |
|---|---|---|---|---|
| 8,235,139 B2* | 8/2012 | Chen | | B24B 23/022 |
| | | | | 173/164 |
| 8,528,658 B2* | 9/2013 | Roehm | | B23B 31/1207 |
| | | | | 173/176 |
| 8,888,602 B2* | 11/2014 | Numata | | F16D 3/64 |
| | | | | 464/160 |
| 9,108,306 B2* | 8/2015 | Hecht | | B25B 21/00 |
| 9,168,651 B2* | 10/2015 | Hecht | | B25F 5/001 |
| 9,242,353 B2* | 1/2016 | Hecht | | B25B 21/00 |
| 9,283,667 B2* | 3/2016 | Zhang | | B25F 5/001 |
| 9,381,579 B2* | 7/2016 | Schenk | | B23B 45/001 |
| 9,415,448 B2* | 8/2016 | Schenk | | B23B 45/008 |
| 2002/0130006 A1* | 9/2002 | Nakamura | | B25B 21/00 |
| | | | | 192/38 |
| 2007/0181322 A1* | 8/2007 | Hansson | | B25F 5/001 |
| | | | | 173/217 |
| 2011/0147023 A1* | 6/2011 | Herr | | B23B 45/008 |
| | | | | 173/47 |
| 2013/0025894 A1* | 1/2013 | Campbell | | B25F 5/001 |
| | | | | 173/20 |
| 2013/0025901 A1* | 1/2013 | Shi | | B25B 21/00 |
| | | | | 173/216 |
| 2013/0270051 A1* | 10/2013 | Hecht | | B25B 21/00 |
| | | | | 192/38 |
| 2013/0284475 A1* | 10/2013 | Hirabayashi | | B25F 5/008 |
| | | | | 173/47 |
| 2013/0284478 A1* | 10/2013 | Saur | | B25F 5/001 |
| | | | | 173/216 |
| 2014/0116740 A1* | 5/2014 | Roehm | | B23Q 5/043 |
| | | | | 173/213 |
| 2014/0124307 A1* | 5/2014 | Esenwein | | B24B 23/028 |
| | | | | 188/180 |
| 2017/0120437 A1* | 5/2017 | Bixler | | B25F 5/001 |

* cited by examiner

HANDHELD MACHINE TOOL HAVING A SPINDLE-LOCKING DEVICE

FIELD OF THE INVENTION

The present invention relates to a handheld machine tool having a tool housing, in which a drive motor is situated for driving a drive element equipped with at least one clamping surface, to which a spindle-locking device equipped with a blocking element and at least one spindle cylinder is assigned, the at least one spindle cylinder being able to be clamped between the at least one clamping surface and the blocking element when the spindle-locking device is in spindle-lock operation in order to prevent the drive element from rotating relative to the tool housing.

BACKGROUND INFORMATION

A handheld machine tool of this type is known from the related art, which has a drive motor situated in a tool housing for driving a drive element, e.g. a drive spindle, equipped with a spindle-locking device. The spindle-locking device has two or more spindle cylinders, which are able to be clamped between associated clamping surfaces of the drive spindle and a blocking element, developed e.g. in the manner of a clamping ring, when the handheld machine tool is in spindle-lock operation, or when the drive motor is switched off, in order to prevent the drive spindle from rotating relative to the tool housing. This allows for the drill chuck to be tightened and released using only one hand, especially in the case of single-sleeved quick-action round shaft drill chucks.

The related art has the disadvantage that spindle-locking devices of this type display nonuniform response behavior in different handheld machine tools, it being possible for a respective torsion angle of the drive spindle when triggering a corresponding spindle-lock operation to be between 6° and more than 360°, depending on a respective machine position and a time duration of a corresponding braking process of the drive spindle prior to triggering the spindle-lock operation. In addition, spindle-lock devices of this type may display a so-called "rattling tendency" due to a great moment of inertia of the respective drive spindle, particularly when using comparatively heavy tool inserts, it being possible for the spindle-locking devices to enter at least briefly into an intermittent spindle-lock operation in particular when the drive spindle is running down. This may result in an undesired noise generation.

SUMMARY

An objective of the present invention therefore is to provide a new handheld machine tool having a spindle-locking device, which has an improved response behavior and a reduced tendency to rattle.

This objective is achieved by a handheld machine tool having a tool housing, in which a drive motor is situated for driving a drive element equipped with at least one clamping surface, to which a spindle-locking device quipped with a blocking element and at least one spindle cylinder is assigned. In spindle-lock operation of the spindle-locking device, the at least one spindle cylinder is lockable between the at least one clamping surface and the blocking element in order to prevent the drive element from rotating relative to the tool housing. The spindle-locking device has an impingement element, which is developed to impinge on the at least one spindle cylinder with a predefined force in the direction of the at least one clamping surface.

The present invention thus makes it possible to provide a handheld machine tool having a spindle-locking device, in which at least a respective response behavior of the spindle-locking device may be improved in spindle-lock operation regardless of a respective spatial position of the handheld machine tool by impinging on the at least one spindle cylinder in the direction of the at least one clamping surface. In addition, the tendency of the spindle-locking device to rattle may be significantly reduced. In this connection, a respective influence of manufacturing tolerances, gravity, magnetism and/or grease adhesion is at least reduced and preferably minimized in the response of the spindle-locking device.

According to one specific embodiment, the impingement element has a viscoelastic ring for impinging on the at least one spindle cylinder.

It is thus possible to provide a simple and cost-effective impingement element.

The viscoelastic ring is preferably situated at least in sections in a groove, in particular an annular groove, developed on the inner circumference of the blocking element.

The viscoelastic ring may thus be situated in a simple manner at least in sections in an area between the blocking element and the at least one spindle cylinder.

According to one specific embodiment, the viscoelastic ring is situated at least in sections in a groove, in particular an annular groove, developed in the tool housing.

The present invention thus allows for a simplified implementation of the spindle-locking device.

The viscoelastic ring preferably has a circular cross section having a cross-sectional diameter of maximally 4 mm.

It is thus possible to provide a robust and cost-effective viscoelastic ring.

The viscoelastic ring preferably has an outer diameter that is greater than an inner diameter of the blocking element.

It is thus possible to ensure in a simple manner that the viscoelastic ring engages at least in regions into the annular groove provided for this purpose on the blocking element or the tool housing and is thus securely and reliably locked in place on the blocking element or the tool housing.

The viscoelastic ring preferably has an inner diameter that is smaller than an inner diameter of the blocking element.

It is thus possible to ensure a secure and stable application of a predefined force on the at least one spindle cylinder in the direction of the at least one clamping surface.

According to one specific embodiment, a center plane of the viscoelastic ring and a center plane of the at least one spindle cylinder have an axial distance from each other that is smaller than or equal to a sum of half the axial length of the at least one spindle cylinder and a cross-sectional diameter of the viscoelastic ring.

The present invention thus makes it possible to provide a handheld machine tool having a spindle-locking device, in which a suitable positioning of the impingement element in the region between the blocking element and the at least one spindle cylinder is made possible in a simple manner.

The blocking element is preferably developed in the manner of a clamping ring.

It is thus possible to provide a robust and stable blocking element.

The drive element is preferably a drive spindle drivable by the drive motor.

In a simple and cost-saving manner, it is thus possible to do without the use of additional torque transmission elements for example.

DETAILED DESCRIPTION

Figure 1:
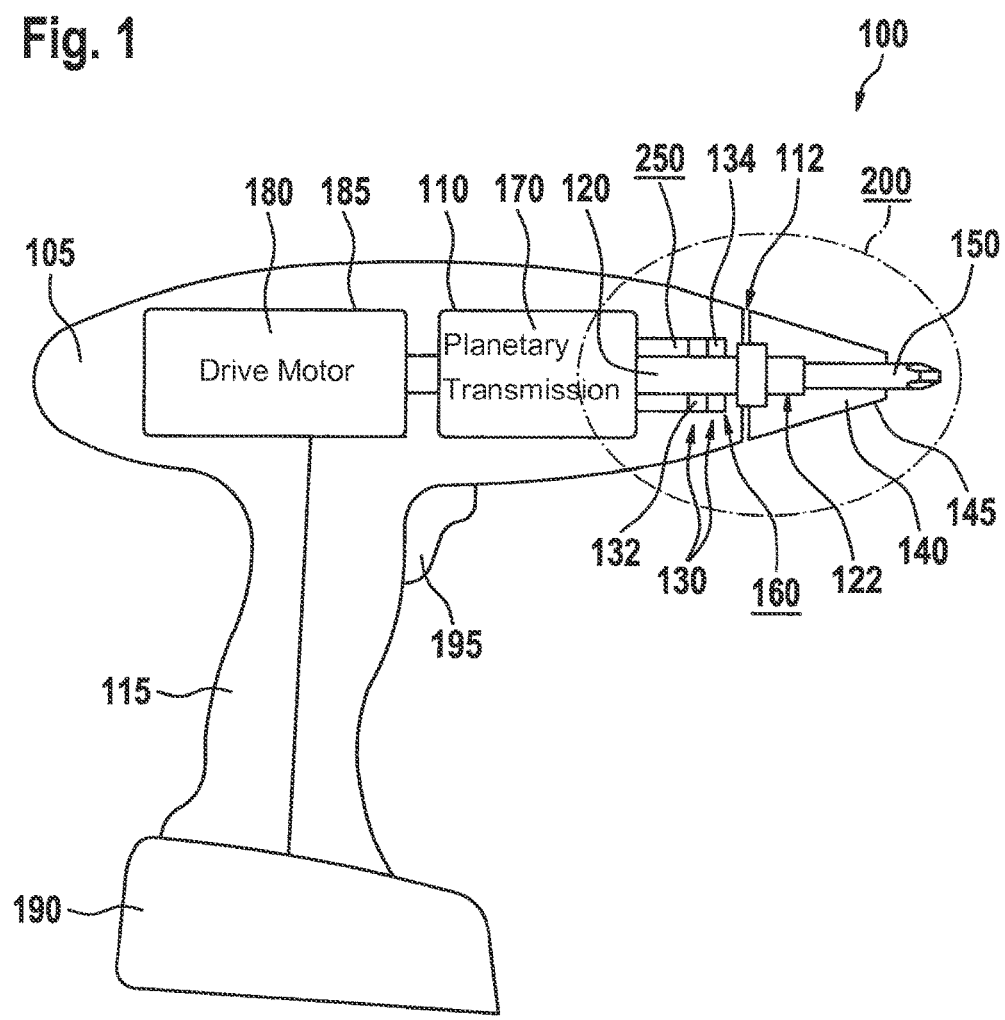
FIG. 1 shows a schematic representation of a handheld machine tool according to the present invention.

FIG. 1 shows a handheld machine tool 100 equipped with an optional torque clutch 160, which has a tool housing 105 having a handle 115. At least one drive motor 180 is situated in tool housing 105 for driving a drive element 120 connected to a tool holder 140, to which a spindle-locking device 250 is assigned.

According to one specific embodiment, handheld machine tool 100 is developed in the manner of a manually guided power tool and is able to be connected, mechanically and electrically, to a rechargeable battery pack 190 for a network-independent supply of current. In FIG. 1, handheld machine tool 100 is developed as a battery-operated screwdriver by way of example. It should be pointed out, however, that the present invention is not limited to manually guided power tools and in particular to battery-operated drills, but rather that it may be used in different types of handheld machine tools, which have a drive element equipped with a spindle-locking device, regardless of whether these handheld machine tools are operated electrically, i.e. by battery or mains, or non-electrically.

In handheld machine tool 100, battery pack 190 supplies current to drive motor 180, which is developed in exemplary fashion as an electric motor. Drive motor 180, for example, is able to be operated, that is, switched on and off, via a manual switch 195 and may be of any desired motor type, for example, an electronically commutated motor or a DC motor. Preferably, drive motor 180 is controllable or regulatable electronically in such a way that both a reversing operation and specifications regarding a desired rotational speed are able to be implemented. The method of functioning and the design of a suitable drive motor are sufficiently known from the related art so that a detailed description is omitted here for the sake of brevity of description.

Drive motor 180 is connected to drive element 120 via a transmission 170 situated in tool housing 105. Drive motor 180 is preferably situated in a motor housing 185 and transmission 170 in a transmission housing 110, transmission housing 110 and motor housing 185 being situated in exemplary fashion in tool housing 105.

Transmission 170 is developed to transmit a torque generated by drive motor 180 to drive element 120 and is merely by way of example, but not necessarily, a planetary transmission developed having different gear or planetary stages, which is driven in rotary fashion by drive motor 180 when handheld machine tool 100 is in operation. Planetary transmission 170 will be described below with reference to a sectional view, shown enlarged in FIG. 2, of a section 200. It should be noted, however, that it is also possible to omit the provision of transmission 170, depending on a selected design of drive motor 180.

Via a bearing system 130, drive element 120 is rotatably supported in tool housing 105 and connected to tool holder 140, which is located in the region of an end face 112 of tool housing 105 and includes a drill chuck 145 by way of example. According to one specific embodiment, bearing system 130 has at least two bearing points 132, 134, which are provided in tool housing 105 in a region downstream from gear unit 170. Tool holder 140 accommodates a tool insert 150 and may be integrally formed on drive element 120 or may be joined to the latter in the form of an attachment. In FIG. 1, for example, tool holder 140 is developed as an attachment and fastened on drive element 120 via a mounting device 122 provided on the latter.

According to one specific embodiment, drive element 120 is associated, as described above, with spindle-locking device 250, which is developed at least to prevent drive element 120 from rotating relative to tool housing 105 in spindle-lock operation. Spindle-locking device 250 is situated, in exemplary fashion, in the axial direction of drive element 120 between transmission 170 and the two bearing points 132, 134, but alternatively may also be situated at another suitable position, e.g. between bearing points 132, 134. The manner of functioning of spindle-locking devices is sufficiently known from the related art such that for the sake of keeping the description brief, a detailed description of the manner of functioning of spindle-locking device 250 is omitted.

Figure 2:
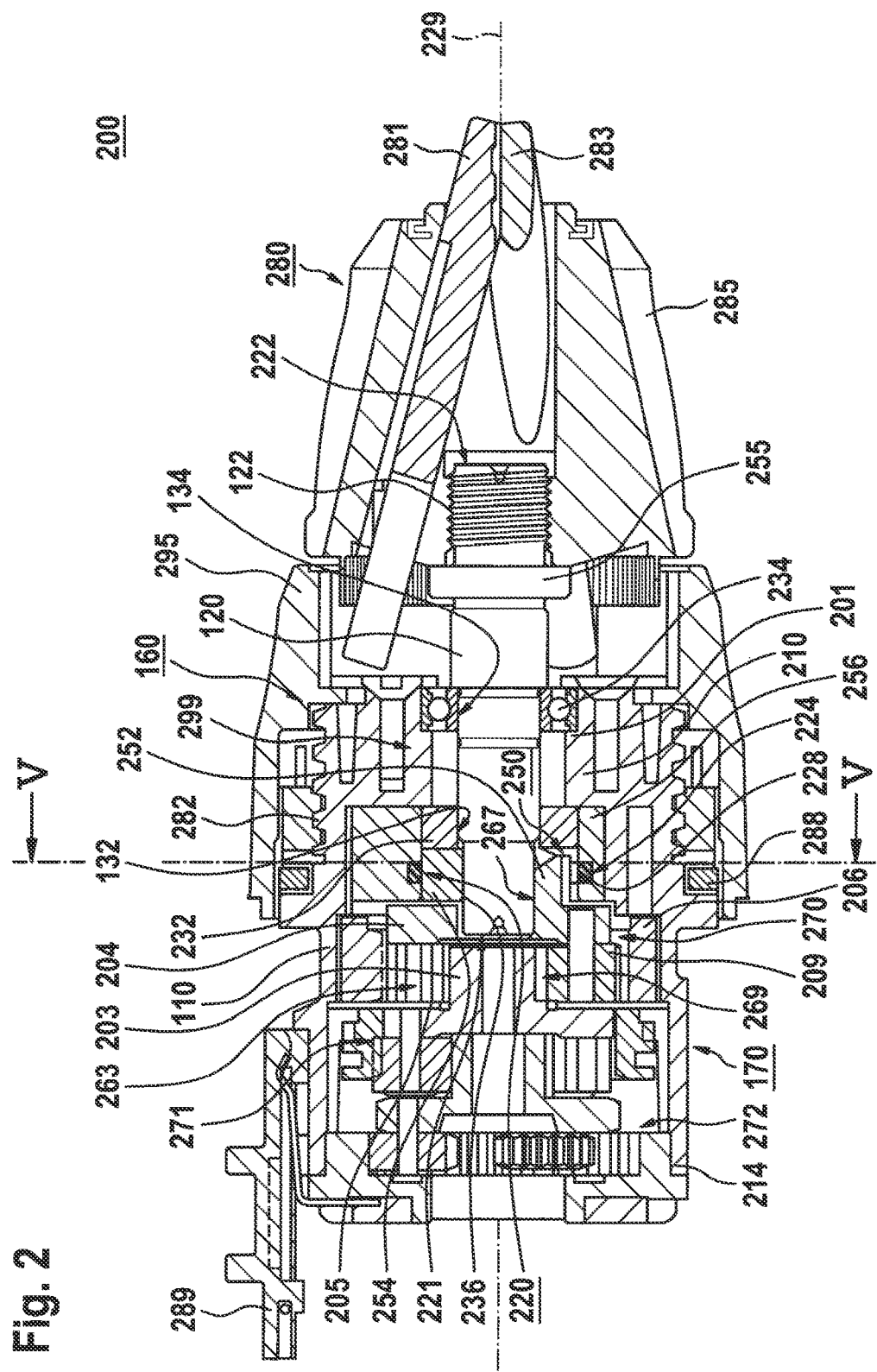
FIG. 2 shows an enlarged sectional view of a section of the handheld machine tool from FIG. 1, according to a first specific embodiment.

FIG. 2 shows section 200 of handheld machine tool 100 from FIG. 1, in which an illustration of tool insert 150 and tool holder 140 from FIG. 1 was omitted for the sake of clarity and simplicity of the drawing. Section 200 illustrates an exemplary development of planetary transmission 170, of drive element 120, bearing points 132, 134 as well as of spindle-locking device 250 developed in accordance with a first specific embodiment.

Planetary transmission 170 is able to be switched at least between a first and a second gear via a slide switch 289 and has, by way of example, three planetary stages: a front stage 270, a center stage 271 and a rear stage 272. Front planetary stage 270, for example, has a sun wheel 203 having gear teeth 269, at least one first planetary wheel 209 as well as a second planetary wheel 205 having gear teeth 263, a planetary carrier 204 having a rotary slaving contour 267, and an annular gear 206. The torque of drive motor 180 from FIG. 1 is transmitted to drive element 120 via planetary stages 272, 271, 270 by the rotary slaving contour 267 of planetary carrier 204. Planetary carrier 204 acts as the driving link in order to drive drive element 120 in rotary fashion. Since the structure of a planetary transmission is sufficiently known to one skilled in the art, a further description of planetary stages 271, 272 is omitted for the sake of keeping the description brief.

Planetary stages 270, 271, 272 are situated, by way of example, in transmission housing 110, which is preferably developed in one piece and which for purposes of illustration is divided into a front section 210—on the right in FIG. 2—and a rear section 214—on the left in FIG. 2. Planetary stages 270, 271, 272 are situated in rear section 214 for purposes of illustration. An annular shoulder 201 is developed in exemplary fashion on the inner circumference of front section 210. An external thread 282 is illustratively developed on the outer circumference of front section 210, on which a torque setting sleeve 295 associated with optional torque clutch 160 is rotatably supported by way of example, which torque setting sleeve 295 is coupled with an annular limitation transmission element 288.

According to one specific embodiment, drive element 120 is a drive spindle supported on the two bearing points 132, 134 so as to be rotatable about an axis of rotation 229, which has an input-side axial end 221 and an output-side axial end 222. It should be noted, however, that instead of a drive spindle developed in one piece, a two-piece drive element may also be used, which is developed from a drive spindle equipped with a torque transmission sleeve. A friction bearing 232, e.g. a sintered bearing, is provided by way of example on bearing point 132, and a roller bearing 234, e.g. a ball bearing, is provided on bearing point 134, the sintered bearing 232 and the ball bearing 234 illustratively being spaced apart from each other by annular shoulder 201 and being situated in a region 299 downstream from transmission 170.

Drive spindle 120 illustratively has a support flange 255 as well as fastening device 122 developed as an external thread, on which a chuck 280 is fastened as an implementation of tool holder 140 from FIG. 1. External thread 122 may be brought into a thread engagement e.g. with an internal thread provided on chuck 280. Chuck 280 has for example a chuck sleeve 285 as well as several chuck jaws 281, 283 and may be developed in any manner also known to one skilled in the art.

According to one specific embodiment, spindle-locking device 250 is situated on the drive-side axial end 221 of drive spindle 120. Spindle-locking device 250 has a carrier element 252 supported on drive spindle 120 with a specified radial play, which in this case is developed in one piece with planetary carrier 204, by way of example, and on which at least one spindle cylinder 254 is situated. The at least one spindle cylinder 254 is supported on a blocking element 256, in which, by way of example, but not necessarily, sintered bearing 232 is likewise situated. Blocking element 256 is likewise associated with spindle-locking device 250 and is developed to prevent the at least one spindle cylinder 254 from slipping out of carrier element 252 in the radial direction of drive spindle 120. In spindle-lock operation of spindle-locking device 250, the at least one spindle cylinder 254 is able to be clamped between blocking element 256 and at least one clamping surface 236 developed on the drive-side axial end 201 of drive spindle 120 in order to prevent drive spindle 120 from rotating relative to transmission housing 110 and thus relative to tool housing 105 from FIG. 1.

Blocking element 256 is developed e.g. in annular fashion in the manner of a clamping ring and is connected at least indirectly—with or without a specified play—in a rotatably fixed manner to tool housing 105. By way of illustration, blocking element 256 is situated in a rotatably fixed manner in the front section 210 of transmission housing 110, it being possible for a corresponding play to exist, at least within specified tolerances, in the axial, radial and/or circumferential direction. Alternatively, blocking element 256 may be connected without play to transmission housing 110, developed in one piece with transmission housing 110, or be molded onto the latter e.g. by plastic extrusion coating.

According to one specific embodiment, spindle-locking device 250 has an impingement element 220, which is developed to impinge on the at least one spindle cylinder 254 with a specified force in the direction of the at least one clamping surface 236. Impingement element 220 is preferably formed from a viscoelastic ring 228, in particular an O-ring, for impinging on the at least one spindle cylinder 254, and is preferably situated radially outside of spindle cylinder 254, seen from the direction of drive spindle 120. This viscoelastic ring 228 is preferably situated at least in sections in a groove 224, in particular an annular groove, developed on the inner circumference of blocking element 256.

According to one specific embodiment, viscoelastic ring 228 has a circular cross section having a cross-sectional diameter of maximally 4 mm, but may alternatively also have any other cross section, e.g. triangular, quadrangular etc. The outer diameter of viscoelastic ring 228 is preferably greater than the inner diameter of blocking element 256, and the inner diameter of viscoelastic ring 228 is preferably smaller than the inner diameter of blocking element 256, at least in the installed state. Moreover, a center plane formed by viscoelastic ring 228 and a center plane of the at least one spindle cylinder 254 have an axial distance from each other that is smaller than or equal to a sum of half the axial length of the at least one spindle cylinder 254 and a cross-sectional diameter of viscoelastic ring 228. These center planes are perpendicular to axis of rotation 229 of drive spindle 120 or in FIG. 2 perpendicular to the plane of the page. NBR, HNBR, EPDM, TPE or FPM may be used for example as the viscoelastic material for developing viscoelastic ring 228 or a viscoelastic material may be used that generally has a Shore A material hardness of at least 60 to 95. Alternatively, e.g. a felt ring may also be used to implement impingement element 220.

Figure 3:
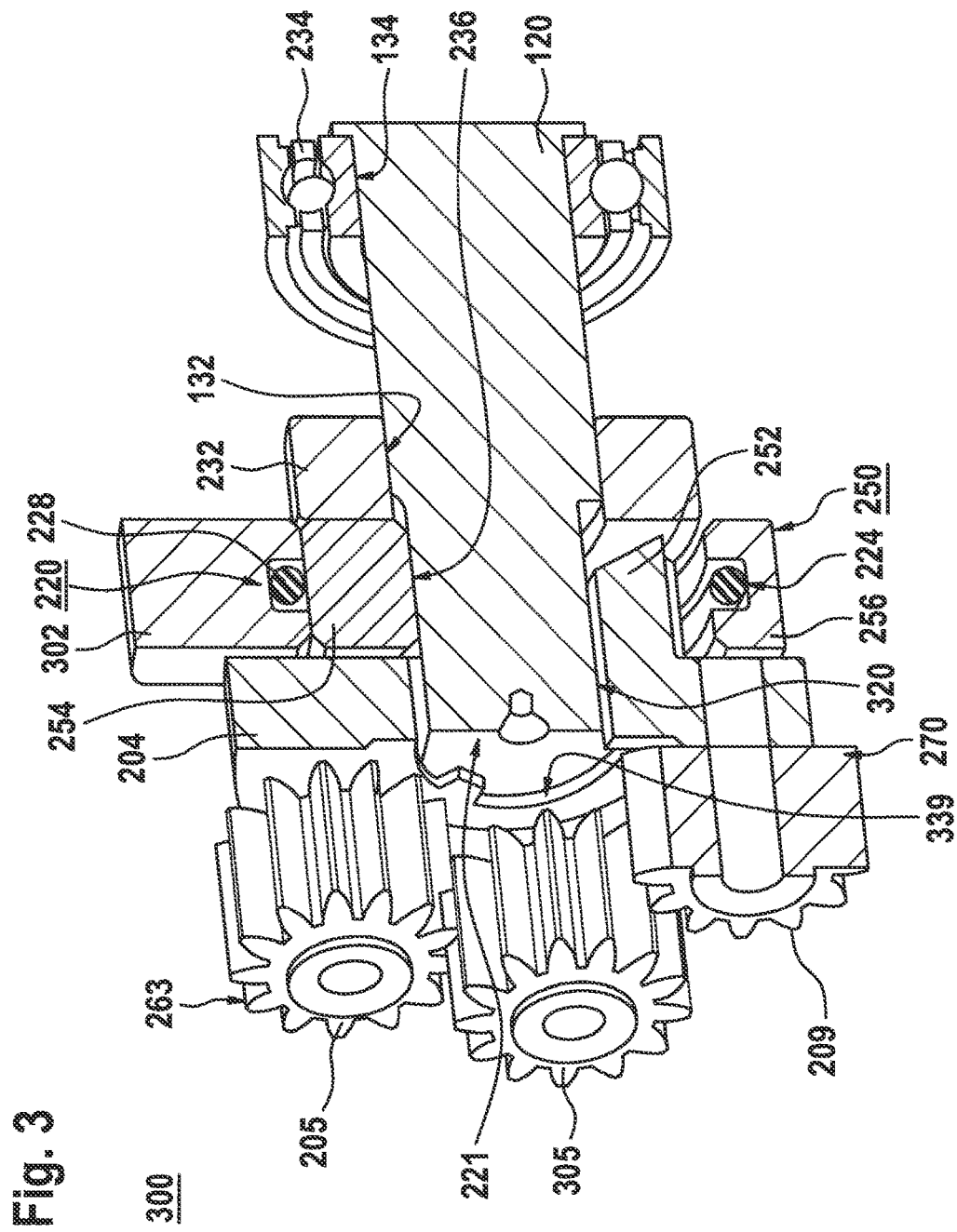
FIG. 3 shows a perspective partly sectional view of a system including the drive spindle, the drive element, the sintered bearing, the ball bearing and the spindle-locking device from FIG. 2.

FIG. 3 shows a system 300 including planetary wheels 205, 209, planetary carrier 204, sintered bearing 232, blocking element 256, impingement element 220, carrier element 252, spindle cylinder 254, ball bearing 234 and drive spindle 120 from FIG. 2. As described above, the latter is situated in a rotatably fixed manner, but having a specified radial play 339, in carrier element 252. Moreover, FIG. 3 shows another planetary wheel 305 of front planetary stage 270, another clamping surface 320, which is developed on the drive-side axial end 221 of drive spindle 120, as well as a radial extension 302 of blocking element 256. As described above, together with impingement element 220, carrier element 252 and spindle cylinder 254, blocking element 256 forms spindle-locking device 250 from FIG. 2.

According to one specific embodiment, spindle cylinder 254 and blocking element 256 have matching axial dimensions, at least within specified tolerances, such that sintered bearing 232 is not situated radially within blocking element 256, as described in the case of FIG. 2, but is situated merely rotatably fixed in transmission housing 110 from FIG. 2. Sintered bearing 232, however, is preferably situated in such a way that spindle cylinder 254 is situated in the region between planetary carrier 204 and sintered bearing 232 and is thus fixed in place axially.

Figure 4:
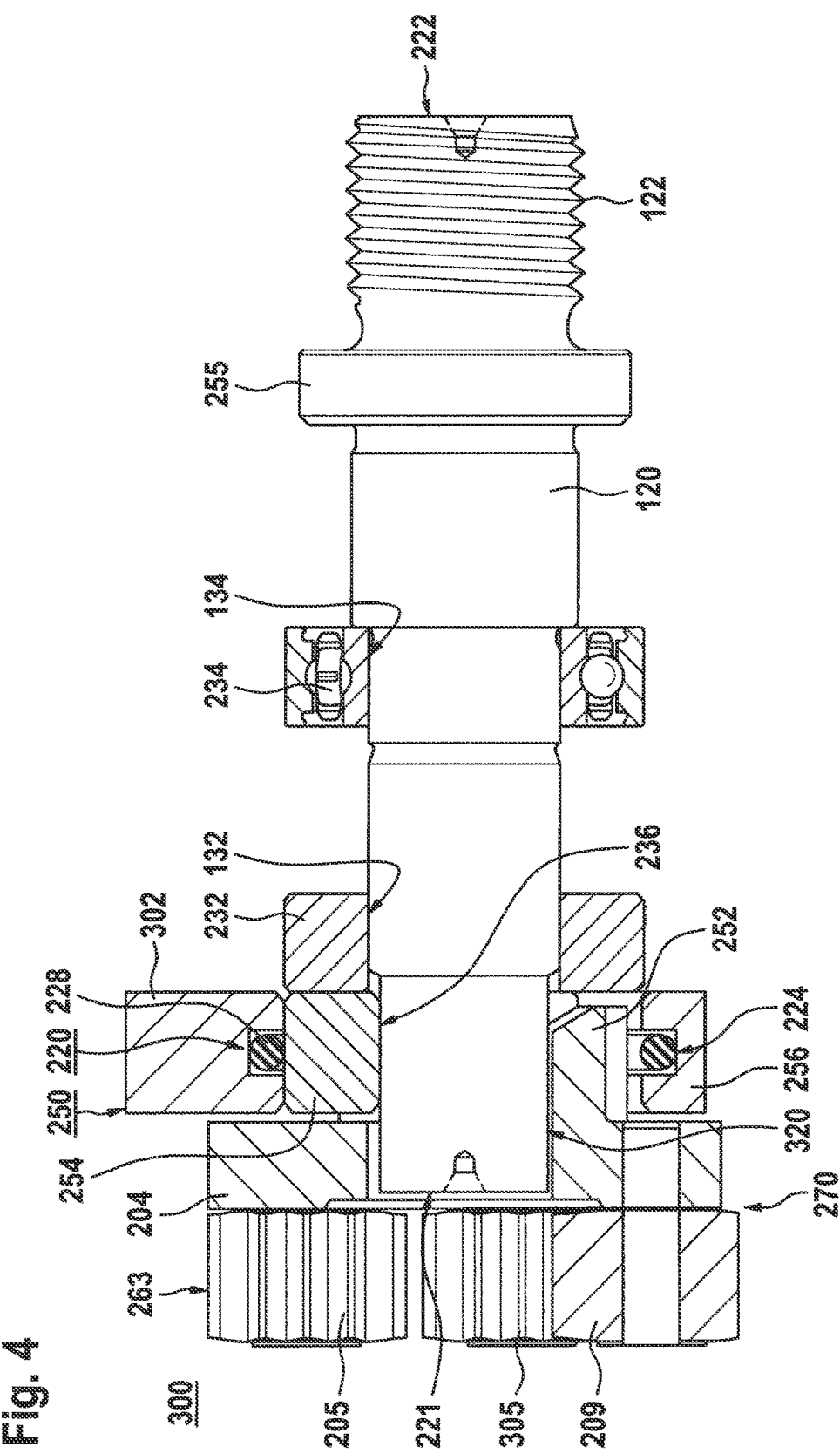
FIG. 4 shows a lateral view of the system from FIG. 3.

FIG. 4 shows system 300 from FIG. 3 to illustrate the spatial fixation of spindle cylinder 254 between planetary carrier 204 and sintered bearing 232 as well as to illustrate the viscoelastic ring 228 situated in annular groove 224 of blocking element 256 for impinging on spindle cylinder 254 in a radially inward direction.

Figure 5:
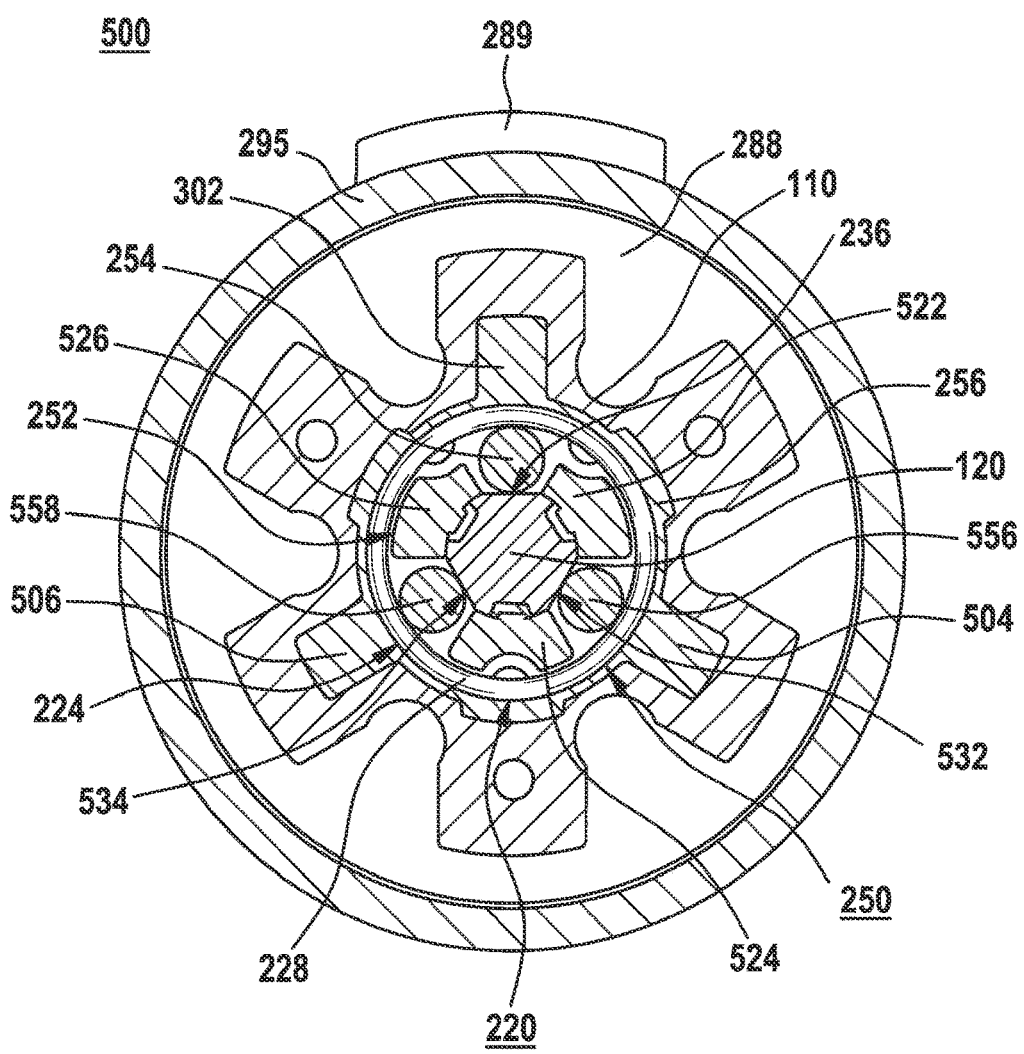
FIG. 5 shows a sectional view of the section of the handheld machine tool from FIG. 1, as seen in the direction of arrows V from FIG. 2.

FIG. 5 shows a system 500 having torque setting sleeve 295, annular limiting transmission element 288, transmission housing 110, blocking element 256, the viscoelastic ring 228 forming impingement element 220, carrier element 252, spindle cylinder 254 and drive spindle 120 from FIG.

2 for illustrating the manner of functioning of spindle-locking device 250 from FIGS. 1 through 4. Blocking element 256, by way of illustration, has the radial extension 302 from FIG. 3 as well as two additional radial extensions 504, 506, via which blocking element 256 is rotatably fixed in transmission housing 110. Carrier element 252 has, by way of illustration, three axially directed slaving elements 522, 524, 526, which are developed to carry along spindle cylinder 254 and two additional spindle cylinders 556, 558 in the normal operation of handheld machine tool 100 from FIG. 1.

According to one specific embodiment, spindle cylinder 254 is pressed by viscoelastic ring 228 against clamping surface 236, as described above, and spindle cylinders 556, 558 are also pressed by this viscoelastic ring 228 against associated clamping surfaces 532 and 534, respectively, which are likewise formed on drive spindle 120. This impingement occurs in every operating state of handheld machine tool 100 from FIG. 1, i.e. both in normal operation as well as in spindle-lock operation, which is triggered when drive motor 180 from FIG. 1 is switched off by twisting drive spindle 120 into a specified direction of rotation. A corresponding rolling friction of viscoelastic ring 228 effects a rolling off of spindle cylinders 254, 556, 558 in the specified direction of rotation within viscoelastic ring 228, a sliding friction arising in the process between clamping surfaces 236, 532, 534 and spindle cylinders 254, 556 and 558, respectively, which is greater than the rolling friction. This results in an overall improved introduction of friction into spindle-locking device 250 and thus in a quick response behavior and an at least reduced tendency of spindle-locking device 250 to rattle.

Figure 6:
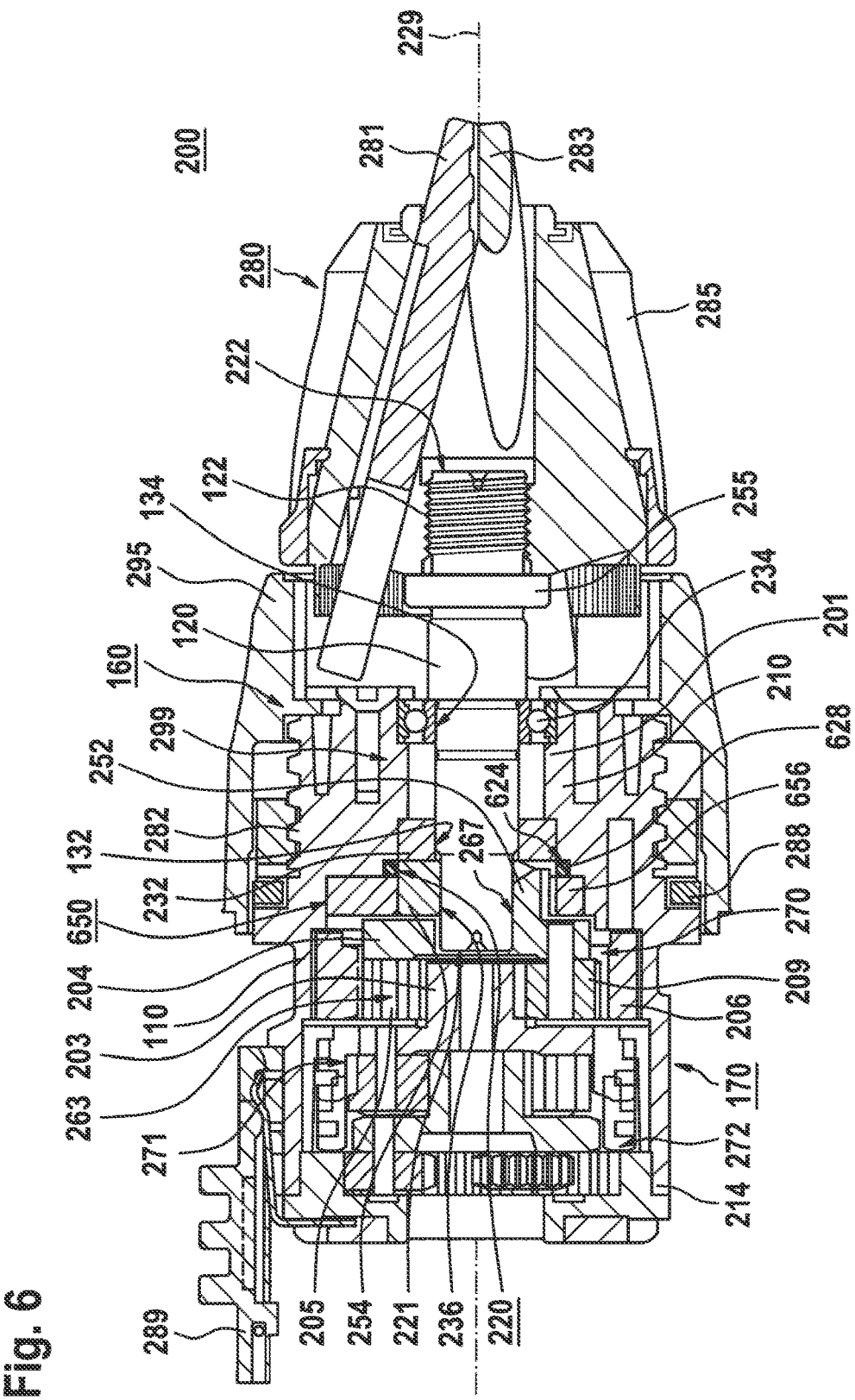
FIG. 6 shows an enlarged sectional view of a section of the handheld machine tool from FIG. 1, according to a second specific embodiment.

FIG. 6 shows section 200 of handheld machine tool 100 from FIG. 1, which is equipped with a modified spindle-locking device 650, in which an illustration of tool insert 150 and tool holder 140 from FIG. 1 was omitted for the sake of clarity and simplicity of the drawing. In contrast to spindle-locking device 250 from FIG. 2, modified spindle-locking device 650 has a blocking element 656 whose axial length is shorter than a corresponding axial length of spindle cylinder 254. For this reason, in spindle-locking device 650, a viscoelastic ring 628 forming impingement element 220 is situated, at least in sections, in a groove 624, in particular an annular groove, developed in tool housing 105 from FIG. 1 and/or, as illustrated in FIG. 6, in transmission housing 110, instead of annular groove 224 developed in blocking element 256 from FIG. 2.

What is claimed is:

1. A handheld machine tool, comprising:
   a drive motor;
   a spindle-locking device having a blocking element embodied as an annular clamping ring and at least one spindle cylinder; and
   a tool housing, in which the drive motor is situated for driving a drive element having at least one clamping surface, to which the spindle-locking device is assigned, wherein:
   the at least one spindle cylinder is configured to be clamped in a spindle-lock operation of the spindle-locking device between the at least one clamping surface of the drive element and the blocking element in order to prevent the drive element from rotating relative to the tool housing, wherein the at least one spindle cylinder is configured to directly contact the at least one clamping surface of the drive element, and
   the spindle-locking device includes an impingement element that impinges on the at least one spindle cylinder with a specified force in a direction of the at least one clamping surface of the drive element,
   wherein the impingement element includes a viscoelastic ring for impinging on the at least one spindle cylinder,
   wherein a transmission housing defines a groove, and the viscoelastic ring is situated at least in sections directly in the groove of the transmission housing,
   wherein the viscoelastic ring is arranged adjacent to the clamping ring in a longitudinal axis of the drive element such that the viscoelastic ring is arranged at a first axial position of the longitudinal axis and the clamping ring is arranged at a second axial position of the longitudinal axis different than the first axial position.

2. The handheld machine as recited in claim 1, wherein the groove is an annular groove.

3. The handheld machine tool as recited in claim 1, wherein the viscoelastic ring has a circular cross section having a cross-sectional diameter of maximally 4mm.

4. The handheld machine tool as recited in claim 1, wherein a center plane formed by the viscoelastic ring and a center plane of the at least one spindle cylinder have an axial distance from each other that is smaller than or equal to a sum of half an axial length of the at least one spindle cylinder and a cross-sectional diameter of the viscoelastic ring.

5. The handheld machine tool as recited in claim 1, wherein the blocking element is developed annularly in the manner of a clamping ring.

6. The handheld machine tool as recited in claim 1, wherein an axial length of the blocking element is shorter than an axial length of the at least one spindle cylinder.

7. The handheld machine tool as recited in claim 1, wherein the drive element is a drive spindle drivable by the drive motor and the at least one clamping surface of the drive element is a clamping surface of the drive spindle.

8. The handheld machine tool as recited in claim 1, further comprising:
   a planet carrier having a rotary slaving contour configured to drive the drive spindle and having a carrier element configured to carry along the at least one spindle cylinder.

9. The handheld machine tool as recited in claim 1, wherein the drive element is a drive spindle drivable by the drive motor.

* * * * *